United States Patent [19]

DeCosta et al.

[11] 4,340,777

[45] Jul. 20, 1982

[54] DYNAMIC POSITION LOCATING SYSTEM

[75] Inventors: John DeCosta, Jackson; James B. Mallos, Freehold; David B. Roe, Lincroft, all of N.J.

[73] Assignee: Bell Telephone Laboratories, Incorporated, Murray Hill, N.J.

[21] Appl. No.: 214,174

[22] Filed: Dec. 8, 1980

[51] Int. Cl.$^{3}$ ........................ G08C 21/00; H04N 1/00

[52] U.S. Cl. ........................................ 178/18; 177/211

[58] Field of Search ....... 177/210 R, 210 C, 210 EM, 177/210 FP, 211, 212, 3, 185, DIG. 3; 73/141 R, 141 A, 172, 763, 765, 767, 769, 770, 772, 777, 781, DIG. 4; 178/18, 19, 20; 340/709, 712, 146.3 SY; 33/1 M

[56] References Cited

U.S. PATENT DOCUMENTS 3,618,019 11/1971 Nemirovsky et al. ..... 340/146.3 SY
3,657,475 4/1972 Peronneau et al. ................... 178/18
4,121,049 10/1978 Roeber ................................. 178/18

OTHER PUBLICATIONS

"One-Point Touch Input of Vector Information for Computer Displays", Herot, *Computer Graphics* for Aug. 1978, pp. 210-216.

*Primary Examiner*—Thomas A. Robinson
*Attorney, Agent, or Firm*—H. L. Newman

[57] ABSTRACT

A position locating system for calculating the coordinates of a localized force applied to a surface (101*a*) has force sensing devices (101, 501, or 501*a*) for supporting the surface (101*a*). The force sensing devices provide force proportional electrical signals to a processing system (512) for calculating the position of the localized force applied to the surface. In order to provide samples of the dynamic alternating current characteristics of the force proportional electrical signals to the processing system, the improvement comprises an alternating coupling circuit (508) associated with each force sensing device. The alternating current coupling circuit accentuates the common dynamic frequency characteristics of the variety of forces presented to the system. The sample collection circuit (511) of processing system (512) sequentially collects samples (401*a*) of the force proportional electric signal from each AC coupling circuit (508). The samples are collected either until a predetermined interval of time lapses (402) or until the second zero crossing (403) of one electrical signal sample is detected, whichever event occurs first. The calculating circuit (512*a*) of the processing system averages the samples before calculating the coordinates of the point of application of the localized force. The calculating circuit also automatically adapts to a changing environment by establishing an average reference level for each force sensing device during a quiescent state condition prior to the collection of force samples.

28 Claims, 11 Drawing Figures

F1
103
102
101a
F̄
109
104
101
108
105
106
107

201
202
FORCE
203
204
5 m SEC.
20m SEC.
50 m SEC.
2000m SEC.
TIME 505a
503a
0
5
10
15
20
25
30
35
40
506a
301
504a
GAIN(db)
2Hz
10Hz
100Hz
1000Hz
2000Hz
FREQUENCY

PROCESSING UNIT
DISPLAY CONTROL
514
514a
512
512a
512b
MEMORY
CALCULATING CIRCUIT
CLOCKING & SAMPLE REQUEST CIRCUIT
511
X
Y
A/D CONVERTER
504
511a
511b
MULTIPLEXER
510
R506
C506
506 A/C COUPLING UNIT
507
R504
C504
504
508
R505
C505
505
503
C503
R503
A/C COUPLING UNIT
A/C COUPLING UNIT
SOURCE OF D.C. REF VOLTAGE
509
501a
501
501

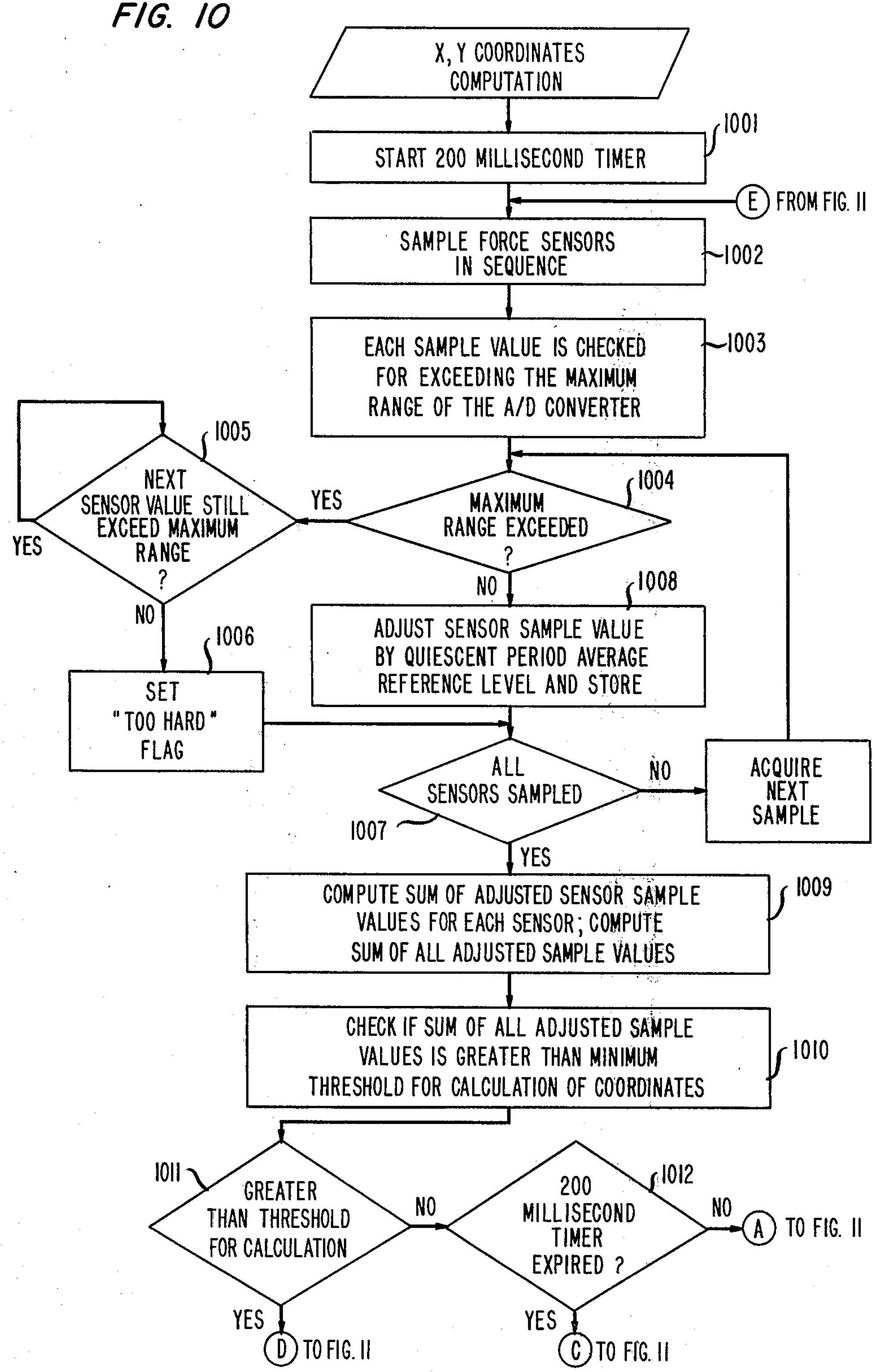
FIG. 10
X, Y COORDINATES COMPUTATION
START 200 MILLISECOND TIMER
1001
E FROM FIG. 11
SAMPLE FORCE SENSORS IN SEQUENCE
1002
EACH SAMPLE VALUE IS CHECKED FOR EXCEEDING THE MAXIMUM RANGE OF THE A/D CONVERTER
1003
1005
NEXT SENSOR VALUE STILL EXCEED MAXIMUM RANGE ?
YES
YES
MAXIMUM RANGE EXCEEDED ?
1004
NO
1008
NO
1006
SET "TOO HARD" FLAG
ADJUST SENSOR SAMPLE VALUE BY QUIESCENT PERIOD AVERAGE REFERENCE LEVEL AND STORE
ALL SENSORS SAMPLED
NO
ACQUIRE NEXT SAMPLE
1007
YES
COMPUTE SUM OF ADJUSTED SENSOR SAMPLE VALUES FOR EACH SENSOR; COMPUTE SUM OF ALL ADJUSTED SAMPLE VALUES
1009
CHECK IF SUM OF ALL ADJUSTED SAMPLE VALUES IS GREATER THAN MINIMUM THRESHOLD FOR CALCULATION OF COORDINATES
1010
1011
GREATER THAN THRESHOLD FOR CALCULATION
NO
200 MILLISECOND TIMER EXPIRED ?
1012
NO
A TO FIG. 11
YES
D TO FIG. 11
YES
C TO FIG. 11

DYNAMIC POSITION LOCATING SYSTEM

CROSS-REFERENCE TO RELATED APPLICATION

A patent application entitled "Mounting Arrangement for a Position Locating System," Ser. No. 214,173, has been filed concurrently herewith by J. DeCosta, J. B. Mallos, and D. B. Roe.

BACKGROUND OF THE INVENTION

1. Technical Field

This invention relates to apparatus for locating the position of a momentary, localized force applied to the surface of a visual display and, more particularly, to an improvement to the alternating current coupling and computer processing circuitry employed in such apparatus.

2. Description of the Prior Art

From the earliest days of interactive computer use, a need has been felt to visually communicate with a computer in a direct, efficient manner. In the desired mode of operation, a computer terminal having a visual display presents to the user a plurality of alternative choices on the display. The user selects one desired alternative by simply touching or tapping the display at a location corresponding to the desired alternative. The computer terminal then reacts to the momentary, localized force of the touch by identifying that the touch has occurred at the location of the selected alternative presented on the display. The terminal may then perform according to the choice made by its user. While the basic goal is simply stated, it will be seen that a practical solution is dependent on the analysis of several problems inherent in prior art position locating systems.

Peronneau et al, U.S. Pat. No. 3,657,475, discloses a position indicating system comprising a rigid plate, a plurality of force sensing devices, and a processing unit. When a localized force is applied to an exposed surface of the plate, the force sensing devices provide the processing unit with electrical signals which are proportional to the localized force. The processing system calculates the coordinates of the location of the localized force touching the plate. Equations from the laws of statics are employed; namely, that the sum of the moments about an axis equals 0.

Peronneau provides an integrator for collecting force sensing device data in a first embodiment of his invention. In this embodiment, both the static and low frequency dynamic characteristics of the touch are provided to the processing unit for calculating the coordinates of the localized force. However, the static forces due to the weight of the plate are not separated from the dynamic characteristics of the applied touch, and this presents an admitted problem to Peronneau. He discloses that in a second, preferred embodiment of his invention the dynamic characteristics of the touch are analyzed. However, Peronneau does not clearly disclose how the dynamic characteristics of the touch are separated from the static characteristics.

Roeber, U.S. Pat. No. 4,121,049, discloses a position and force measurement system comprising touch plate apparatus and a digital processing system. The touch plate apparatus comprises two similar rectangular rigid surfaces one of which being exposed to the application of a touch force. The edges of the surfaces are joined by semicircular springs upon which are mounted strain gauge sensors. Stresses detected by the sensors are proportional to the magnitude of the downward movement of the exposed surface when a force is applied to it. Accordingly, the magnitude of the tangential force and the coordinates of its location may be calculated.

An improvement over Peronneau which Roeber discloses is a threshold comparator amplifier for insuring that the applied touch is above a predetermined threshold level. A shortcoming of the use of the comparator amplifier is that the predetermined threshold level does not automatically adapt to the environment or the quiescent state orientation of the touch plate apparatus. For example, if the Roeber touch plate apparatus is rotated from a vertical to a more horizontal orientation, the weight of the touch plate causes a corresponding increase in the stress detected by the strain gauge sensors. As a result, the threshold level must be manually increased to compensate for the increased stress.

Roeber also discloses an improved digital processing system for calculating the location coordinates. Roeber discloses that the digital processing system comprises a clocking and sample request circuit and an analog to digital converter. Responsive to the clocking circuit, the multiplexer and analog to digital converter provide the digital processor with digitized samples of the static characteristics of the touch. No sampling rate is disclosed; however, it is disclosed that the digital processor repeatedly computes coordinate values for each set of samples until the magnitude of the force of the touch falls below the predetermined threshold sensing level of the threshold comparator circuit.

Other touch sensitive systems have been developed which do not react to the force of a touch. These systems employ a great variety of technologies including ultrasonic echo timers, resistive film contact sensors, optical beam detectors including infrared beam detectors and light pens. These technologies suffer, however, from high costs. On the other hand, their commercial success demonstrates the great demand for a touch sensitive human interface with a visual display.

Systems for selection of menus and items of menus have been developed outside the art of touch sensitive displays. These include joy stick and cursor systems and other keyboard systems. The several alternatives suggest means for positioning a cursor on a screen to choose an appropriate menu or an item from a menu. In general, they provide external means for causing the cursor to move about the screen to the desired location. It is believed, however, that it is more desirable to directly effectuate these functions without using external apparatus.

Accordingly, it is believed that there remains a requirement for a dynamic position locating system for directly and efficiently calculating the coordinates of a momentary touch so that a computer processing system may identify a selected alternative and perform according to the choice made by its user.

SUMMARY OF THE INVENTION

The above-stated problems and related problems of the prior art are solved with the principles of the present invention. The present invention accepts different durations and magnitudes of touches in accordance with the design of coupling circuitry, located between the force sensing devices and the processing system of the present dynamic position locating system. One such alternating current coupling circuit is associated with each force sensing device. The dynamic response characteristics of an object touching a visual display mounted to the plurality of force sensing devices are recovered through the coupling circuits of the present invention.

Similar damped sinusoidal voltage/time curves are achieved for various types of touches by employing the novel alternating current coupling circuitry of the present invention in combination with an arrangement such as the "Mounting Arrangement for a Position Locating System," disclosed in application Ser. No. 214,173 filed concurrently herewith by J. DeCosta, J. B. Mallos, and D. B. Roe. The damping of the touch response permits the sequential entry of touches into the system at a rapid rate. In an embodiment constructed by the inventors, taps are enterable into the system at a rate of four per second.

The touch force is sampled at a predetermined sampling rate chosen to be much higher than the highest rate at which a finger or stylus may be used to touch the exposed surface of the screen so that the effects of quantization error and noise are minimized. Analog samples of the touch are collected during the touch and digitized by passage through an analog to digital converter. The sampling continues until a predetermined time interval expires. Employing equations from the laws of statics, the associated digital computer processing unit calculates the coordinates of the touch. The processing unit, from a comparison of the calculated coordinates with those of the choices, identifies which alternative of a plurality of alternative choices has been selected. The processing unit then responds in a manner corresponding to the selected choice.

A feature of the present invention is that a plurality of samples are collected for each force sensing device during the touch to the touch surface and then averaged before the calculation of coordinate values is performed. In this manner an improvement in the accuracy of the coordinate calculation is achieved over prior art touch sensitive apparatus.

The computer processing unit of the present invention automatically establishes average reference voltage levels for each force sensing device prior to the beginning of a touch. When the system is initialized or the completion of a touch detected by the present system, new average reference voltage levels are automatically established under the control of the processing unit.

The computer processing unit of the present invention also monitors the touch force and rejects forces that are too hard, soft, or short. A warning of a touch that is too hard also may be provided to the user. The calculation of coordinates after a touch that is too soft or hard, while less accurate, may proceed nevertheless.

The present invention may be used with several types of visual displays. These include, but are not limited to, plasma panels, liquid crystal displays and light emitting diode displays.

Employing a tree selection software structure for achieving menu and item selection, the present invention may be employed in several types of applications, including, but not limited to, dual frequency tone dialing of a telephone, repertory telephone dialing, information retrieval, and file storage services. It may also have application as a programmable keyboard having selectable keyboard structures as, for example, a programmable typewriter keyboard or a security system panel.

BRIEF DESCRIPTION OF THE DRAWINGS

FIG. 10 is a flowchart of a subroutine for computing the x,y coordinates of a touch.

DETAILED DESCRIPTION

Figure 1:
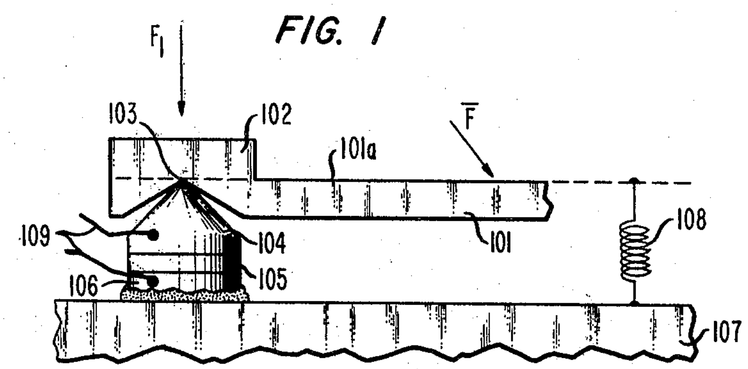
FIG. 1 is a drawing of the mounting arrangement disclosed and claimed in the patent application filed concurrently herewith by J. DeCosta, J. B. Mallos, and D. B. Roe entitled "Mounting Arrangement for a Position Locating System," Ser. No. 214,173.

Referring to FIG. 1, one mounting arrangement for a dynamic, touch sensitive position locating system is shown which may be used in accordance with the principles of the present invention. It is presumed in the embodiment of FIG. 1 that there are at least three such mounting arrangements so that triangular support is provided to a touch plate 101 of the touch sensitive position locating system.

The mounting arrangement comprises a pointed member 104 and a receiving member 102 for receiving the point of the pointed member. A force sensing member 105 joined to the pointed member detects a perpendicular component force $F_1$ caused by the weight of touch plate 101, by the tension of spring 108, and by a localized, directional force F applied at a point M by the user of the apparatus to an exposed surface 101*a* of touch plate 101. The term "force" as used here and elsewhere in the specification and claims is intended to generally include force-related terms such as stress, strain, pressure and other terms known in the art.

The force sensing member 105 detects the perpendicular component force $F_1$ at point of action 103 of the combination. Accordingly, no spurious moments are created about the points of action 103. As the points of action 103 of all the mounting arrangements of touch plate 101 are in the same plane as exposed surface 101a, a nonperpendicular force F will not affect the detection of force $F_1$ by force sensing member 105.

Electrical access leads 109 are connected to members 104 and 106 which comprise a conductive material. Accordingly, when no force F is applied by a user to surface 101a, an electrical signal may be acquired which is proportional to the weight of the touch plate 101 and to the tension of the spring 108. When a touch force F is applied to the surface 101a of touch plate 101, the detected force $F_1$ proportionately changes with the applied force F.

The operation of a touch-sensitive position locating system of which the mounting arrangement and the other depicted apparatus of FIG. 1 comprise a part is now briefly described. The x,y coordinates of the point of application M of localized force F are calculated by detecting the reactionary perpendicular components of the force F through the force sensing members 105 of the mounting arrangements. Equations from the laws of statics are employed, namely that the sum of the moments about a point must equal zero. As the locations of the points of action 103 of the mounting arrangements are known and all the reactionary forces have been detected, two moment arm equations are solved for the x,y coordinates, respectively, of the point of application M using an associated computer processing system.

The depicted mounting arrangement and other mounting arrangements which may be applied with the present invention are more particularly described in the patent application filed concurrently herewith by J. DeCosta, J. B. Mallos, and D. B. Roe entitled "Mounting Arrangement for a Position Locating System," Ser. No. 214,173.

Figure 2:
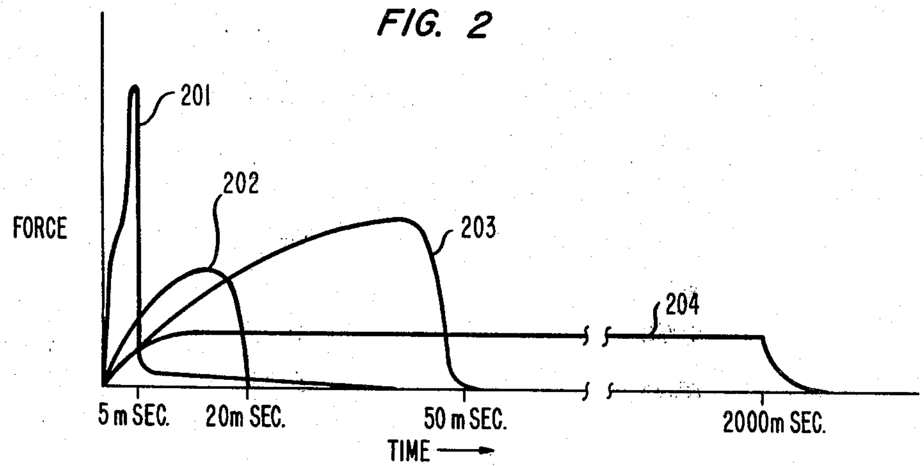
FIG. 2 is a graphical representation of the Force vs. Time characteristics of several types of touches impinging upon a rigid body.

Referring to FIG. 2, a graphical representation of the Force vs. Time characteristics of several types of touches is shown. Curves 201–204 represent a sharp tap; a fingertip tap; a slow, hard tap; and a light push, respectively, and are representative of the variety of touches that a user of the present system may be expected to apply to touch surface 101a of FIG. 1. The curves are pragmatic estimates of measurements taken on leads 109 to force sensing device 105 of FIG. 1.

The sharpest of taps 201 to the surface 101a of touch plate 101 may cause a one to five millisecond spike. On the other hand, a light push 204 may register a nearly constant signal of as much as two seconds duration.

Figure 3:
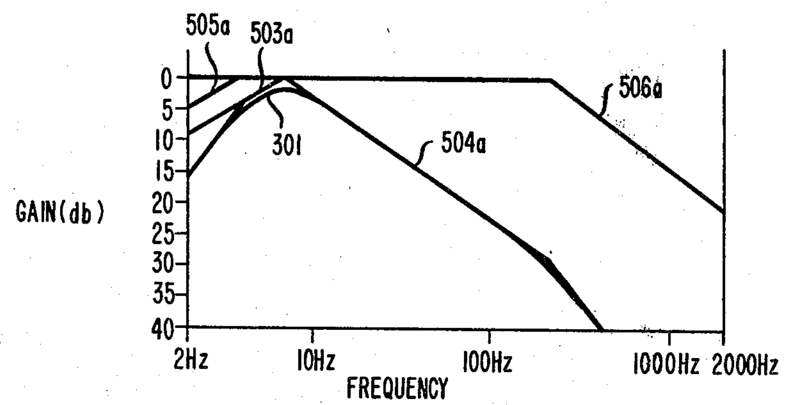
FIG. 3 is a semilogarithmic, graphical representation of the Gain vs. Frequency (dynamic transfer) characteristics of one alternating current coupling circuit which may be used in accordance with the principles of the present invention and in combination with the mounting arrangement of FIG. 1.

In order to accommodate the wide variety of touches, a coupling unit is employed whose dynamic response characteristics accentuate the common frequency and magnitude characteristics of the variety of touches 201–204. Referring to FIG. 3, the dynamic response characteristics of one such coupling unit are shown. The high frequency roll-off of curve 301 above 8 Hz attenuates the high frequencies of the sharp tap 201. The low frequency roll-off below 8 Hz rejects the static or direct current components and attenuates the low frequency components of the light push 204.

Figure 4:
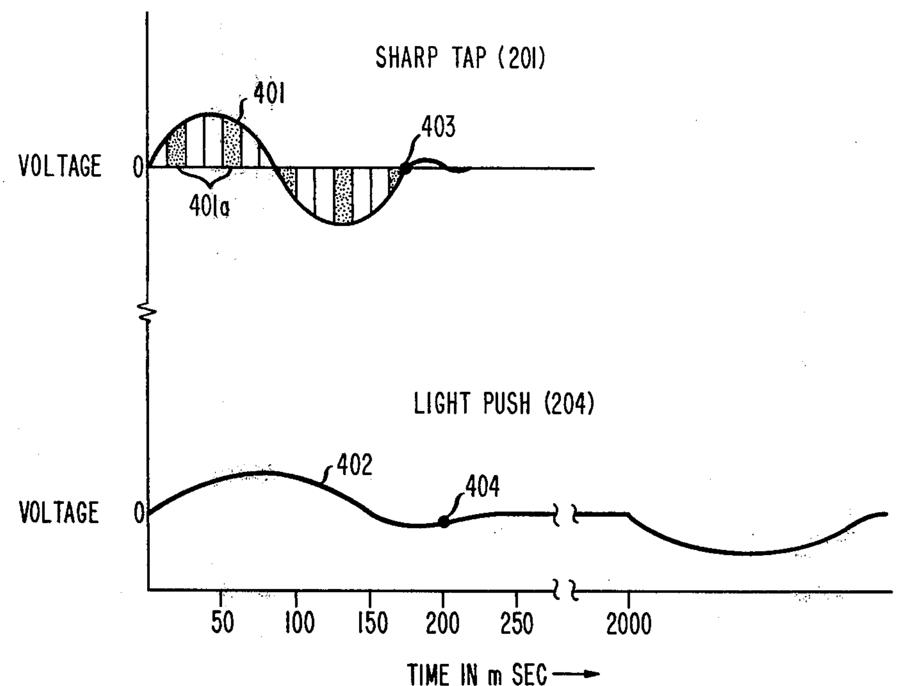
FIG. 4 is a graphical representation of the Voltage vs. Time characteristics of a long and a short touch applied to a touch surface mounted in accordance with FIG. 1, the characteristics being measured at the output of an alternating current coupling circuit of the present invention.

Referring to FIG. 4, graphical representations of the Voltage vs. Time characteristics of the light push 204 of FIG. 2 and the sharp tap 201 of FIG. 2 are shown. The depicted characteristics are measured at the output of an alternating current coupling circuit designed so as to apply the dynamic response characteristics of FIG. 3 to the force/time curves of FIG. 2. Curve 401 is the smoothed impulse or sharp tap response of the alternating current coupling circuit. In contrast to the 1–5 millisecond duration of curve 201 of FIG. 2, the available sampling time of about 175 milliseconds allows a plurality of samples 401a to be taken.

Curve 402 represents the light push. In comparison with curve 204 of FIG. 2, curve 402 exhibits two periods when samples can be taken: when the light push first occurs and, at 2000 milliseconds, when it is released. It is believed apparent that all types of touches 201–204 exhibit more similar characteristics after passing through a coupling unit designed in accordance with the principles of the present invention.

For the sharp tap curve 401, sampling ceases at the time of the second zero crossing 403. Two half cycles of valuable data are collectible before the signal is damped below useful levels. With respect to the light push curve 402, sampling ceases after a predetermined time interval 404 expires, for example, 200 milliseconds. It is not practical to await the release period of the light push curve 402 to acquire the second (after 2000 milliseconds) damped wave of samples.

Referring briefly to FIG. 10, a subroutine for computing the touch coordinates x,y is presented in flowchart form. It is demonstrated in boxes 1001, 1012, 1013, 1014, and 1021 of the flowchart that sampling ceases either at the second zero crossing or after a predetermined time interval, whichever event occurs first.

Figure 5:
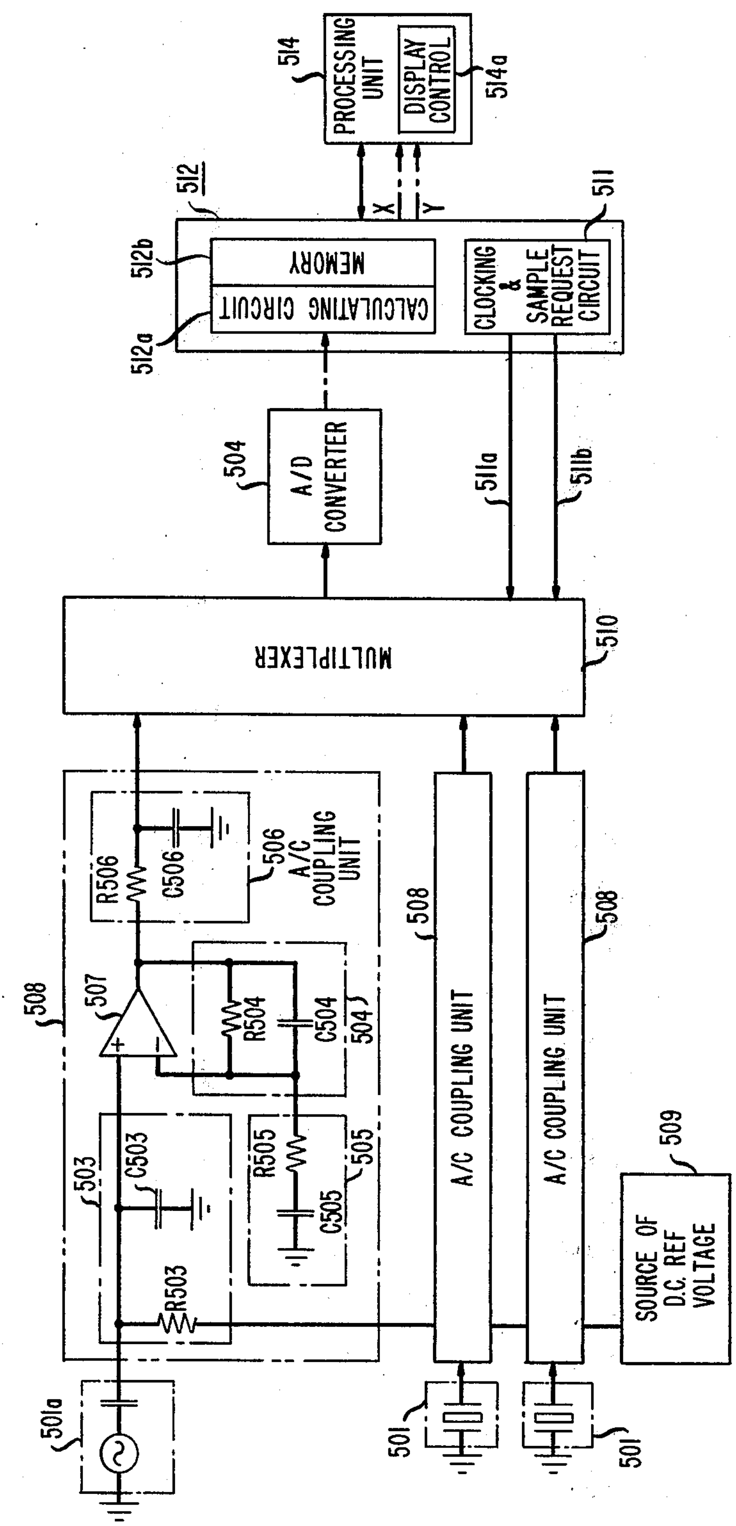
FIG. 5 is a schematic drawing of one embodiment of a dynamic position locating system for providing the coordinates of location of a force impinging on a rigid body.

Referring to FIG. 5, a coupling unit 508 in accordance with the principles of the present invention is shown coupling a force sensing device 501 with a multiplexer 510 and an analog to digital converter 504 associated with a digital processing unit 512. The depicted coupling unit 508 is designed to couple a piezoelectric transducer sensing device 501. Piezoelectric transducers generally have the equivalent circuit 501a comprising a source of alternating current voltage and a capacitor. A constant biasing voltage is provided to piezoelectric transducers (501) by a source of direct current voltage (509).

Should a different type of force sensing device be employed which does not display the characteristics of a capacitive equivalent circuit, coupling unit 508 may be redesigned to provide the same or other desirable gain/frequency characteristics similar to those presented in FIG. 3.

Coupling unit 508 comprises several component circuits. In the depicted embodiment, component filter stages 503 and 505 provide the low frequency (less than 8 Hz) roll-off characteristics 503a and 505a, respectively, presented in FIG. 3. Curves 503a and 505a combine to form the low frequency characteristics of curve 301. Component filter stages 504 and 506 provide the high frequency roll-off characteristic curves 504a and 506a. Amplifier 507 provides gain and impedance matching to the signal recovered from force sensing device 501. In general, any characteristic curve 301 may be employed so long as (1) the associated coupling unit is able to match impedances between the force sensing device and the computer processing system employed and (2) the characteristic curve 301 accentuates the common dynamic characteristics of the variety of touches that impinge on the touch surface of the position locating system. Table A provides values for the components of the depicted coupling unit 508, including the electrical components of filter stages 503, 504, 505, and 506. It should be recognized that coupling unit 508 is designed to compliment a piezoelectric transducer element 501 and that the table values may not be employed with other types of force sensing members.

TABLE A

Component Values for the Alternating Current Coupling Circuit 508 of FIG. 5

| | R503 | C503 | | R505 | C505 |
|---|---|---|---|---|---|
| Filter 503 | 2.7MΩ | 7150pf | Filter 505 | 22.1KΩ | 1.47μf |
| | R504 | C504 | | R506 | C506 |
| Filter 504 | 1MΩ | 7150pf | Filter 506 | 10.5KΩ | 0.511μf |

Multiplexer 510 is employed to sequentially collect samples from the plurality of alternating current coupling units 508. A clocking and sample request circuit 511 of processing system 512 addresses multiplexer 510 to collect an analog sample from the addressed force sensing device 501. As previously described, its sampling rate is chosen to be much higher than the highest rate at which sample touches may enter the system. Two leads 511a and 511b are shown for this purpose which assumes a maximum of four addressable force sensing devices 501.

The analog samples are provided to the processing system 512 through an analog to digital converter 504. Accordingly, digital samples are provided to the calculating circuit 512a.

Calculating circuit 512a is a multifunctional component of processing unit 512. It comprises mathematical capability for addition, subtraction, and division. Memory 512b of processing unit 512 comprises permanent memory for storage of software algorithms and temporary memory for scratch pad use during mathematical calculations and for storage of variable information such as average reference levels for each force sensing device.

In the depicted dynamic position locating system, constant voltages caused by the weight of the touch plate or the tension of the spring are eliminated by the choice of a piezoelectric transducer having a known capacitive equivalent circuit and of the resistor R503. There remains a requirement, however, to determine a reference level of the electrical signal proceeding from each force sensing device through the alternating current coupling unit during a quiescent period. Variations in the particular characteristics of the individual force sensing devices, the alternating current coupling circuit and other components of the system, effects due to aging and temperature, and other environmental effects are compensated for by employing the calculating circuit 512a of the present invention and an associated software subroutine.

Initialization of the system occurs when power is provided to the system or after each successive touch. Processing unit 512 responsive to an algorithm stored in permanent memory 512b calls for several electrical samples of forces detected by the plurality of force sensing devices 501. The samples are accumulated in temporary memory 512b. The plurality of collected samples for each force sensing device 501 are then averaged in order to establish an average reference voltage level for each force sensing device.

Figure 8:
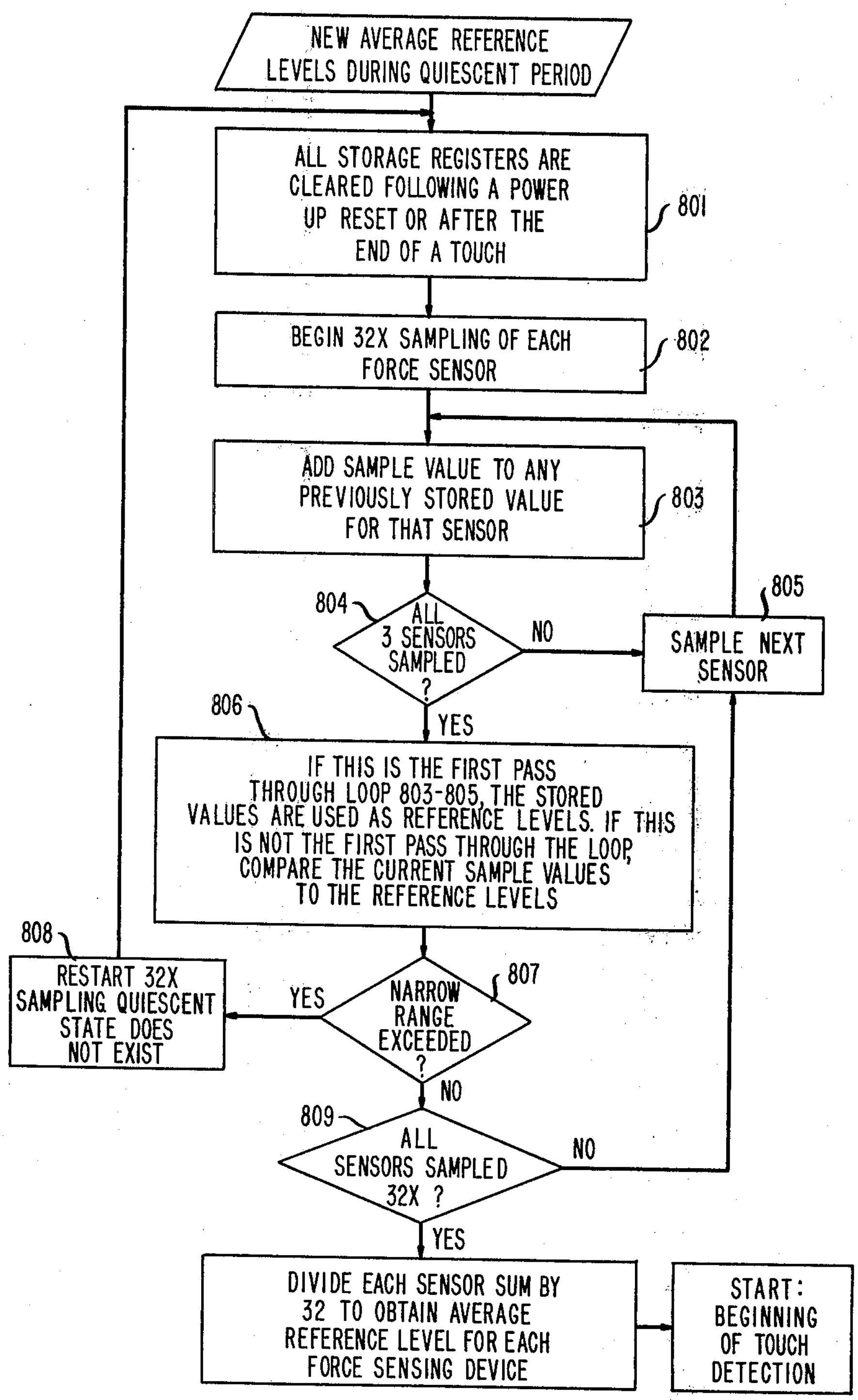
FIG. 8 is a flowchart of a subroutine for automatically calculating new reference values during a quiescent period.

Referring to FIG. 8, a flowchart of the subroutine for calculating new average reference levels during a quiescent period is presented. In boxes 801–809, thirty-two samples of three force sensing devices 501 are separately accumulated, averaged, and stored. The effect of this is to establish three average reference levels from which to measure the dynamic voltages caused by a touch. In box 807, if a given sensor sample falls outside a narrow range around the first collected sensor sample, the processor 512 restarts the collection process. This ensures that the average reference levels are established during a quiescent period.

Figure 9:
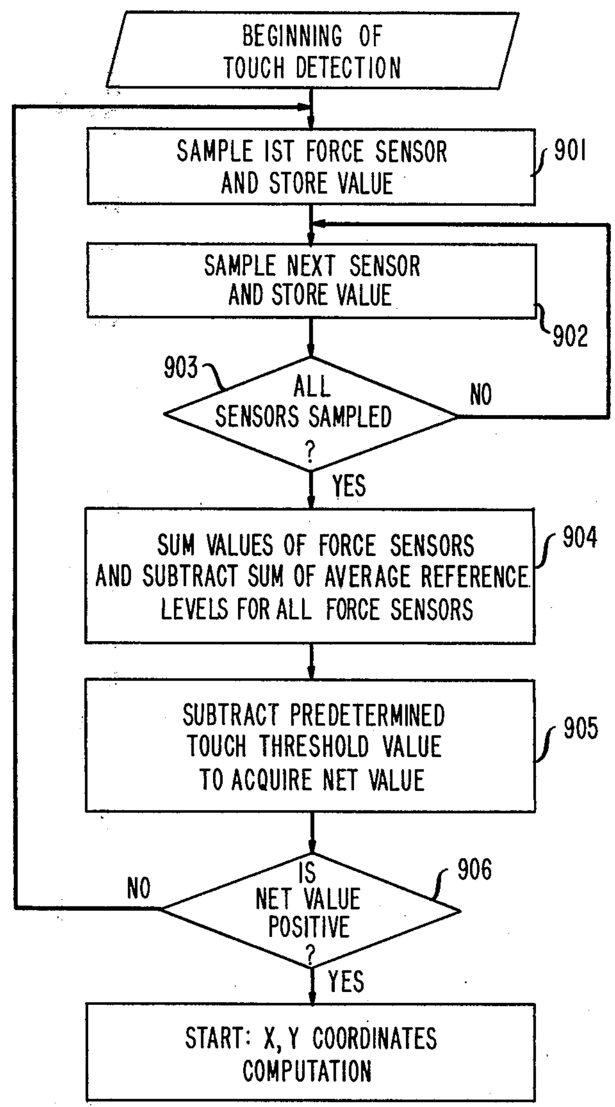
FIG. 9 is a flowchart of a subroutine for detecting the beginning of a touch.

Referring to FIG. 9, a flowchart of a subroutine for detecting the beginning of a touch is presented. From boxes 901–906, it may be seen that a subsequent touch begins when the sum of the sampled voltages from all force sensing devices 501 minus the sum of their respective average reference levels is greater than a predetermined threshold value. The predetermined threshold value is chosen by considering the effects of floor vibrations on the system or moving or accidental tapping of the system. A consideration applicable to a piezoelectric transducer touch system is undesirable static electric influences which are improved upon by grounding the screen and by compensation through the appropriate choice of threshold value. The establishment of this predetermined threshold and the average reference level established for each force sensing device is similar to requiring that the total force measured by the force sensing devices be greater than a threshold value provided to a single comparator amplifier. However, the advantage the present invention assumes over the use of a comparator amplifier is that the present threshold value is unaffected by changes in environment or by static forces detected by the system.

Figure 11:
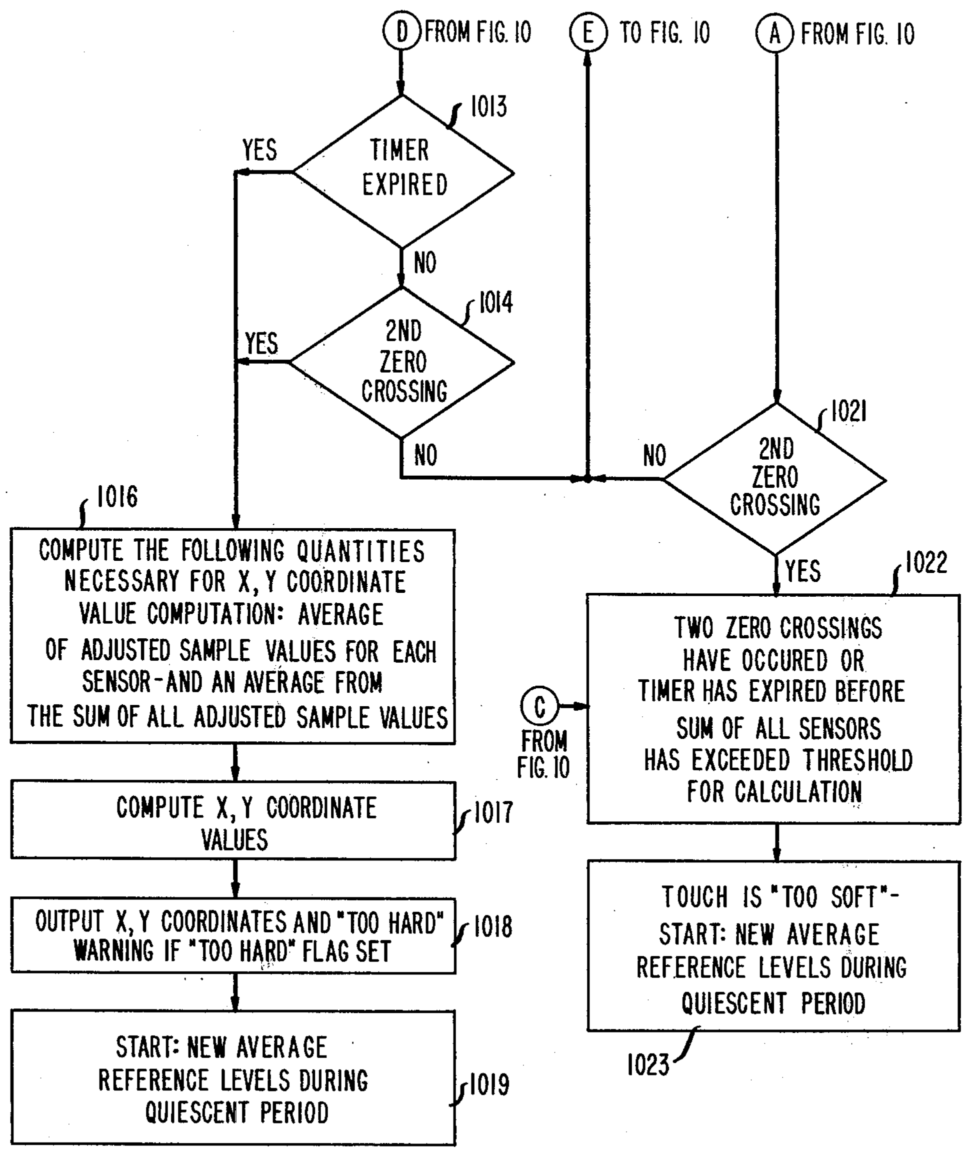
FIG. 11 is a continuation of FIG. 10 which is a flowchart for computing the x,y coordinates of a touch.

Referring to FIGS. 10 and 11, a subroutine for computing the x,y coordinates of the point of touch is presented. In box 1008 the quiescent period average reference level for each force sensing device is digitally subtracted from the sampled voltage level for that sensor as the samples are collected and stored in temporary memory 512b. These adjusted sample values represent the reactionary component forces caused by the momentary, localized force F.

At box 1009 the sum of adjusted sensor sample values for each force sensing device and the sum of the adjusted sensor sample values for all of the sensing devices are accumulated in memory 512b. At box 1016 these sums are averaged by dividing by the number of samples collected. In this manner, an average adjusted sample value is acquired for each force sensing device as well as an average value of their sum.

The present processing unit 512 also monitors the touch force values detected by the force sensing devices. If a touch force which is too high (too hard) is detected, corrective action is taken. If the touch force is too soft, that is, momentarily exceeds the predetermined threshold but does not remain above that level for very many samples, corrective action may also be taken.

At boxes 1003 and 1004 if the forces detected are so large that the range of the analog to digital converter 504 is exceeded, the processor 512 receives a saturated, full-scale signal. Accordingly, it is appropriate Accordingly, it is appropriate that the bit capacity of the analog to digital converter 504 be significantly less than a force value which can potentially damage the position locating system. After box 1002 of the subroutine and upon receipt of this signal from the analog to digital converter 504, the processor enters a mode comprising box 1005 in which all force sensing devices 501 are sequentially polled as before, but the sampled data is not averaged into the cumulative total. The sole function of the sampling in this mode is to wait until the forces detected by each of the force sensing devices return to acceptable levels. At that time, the normal mode of sampling and averaging resumes as in the path comprising boxes 1004, 1007, and 1008.

Accordingly, at the very peak of an applied force that is "too hard", the processor 512 ignores the data because the linear range of the analog to digital converter 504 is exceeded. However, a determination of the coordinates of the touch is still made based on the data collected before the touch force exceeds the maximum range and after it has decreased again below the maximum range. This coordinate calculation is less accurate than with a proper touch force, however. Therefore, at box 1006 a "too hard" flag is set; and at box 1018, display control unit 514*a* may be activated to warn the user not to touch the touch surface so hard. Display control 514*a* may provide both an audible tone and a visual indication, "TOO HARD." This warning occurs before any action resulting from interpretation of the coordinates of the touch. Shortly after the warning, the user requested action may be performed.

Occasionally, a user touches the screen so lightly that the peak of the detected force signal barely exceeds the predetermined threshold for the beginning of touch, then the signal falls quickly back to zero. In this case, there is so little data available from which to calculate the coordinates that the accuracy of the calculations are impaired by quantization and signal noise.

To prevent coordinate calculations with large errors from being misinterpreted, touches soft enough to cause problems are treated specially. At box 1023 the user may be warned as with a hard touch that his touch is too soft. It was discovered, however, that a far more effective solution is to ignore soft touches of short duration entirely. The natural response is to hit the touch sensitive display harder, which is, in this case, desirable. One processing unit 512 constructed by the inventors accepts soft touches that are long enough to provide noise immunity (a sufficient number and magnitude of samples above the threshold are acquired) but rejects shorter soft touches. This provides a greater range of acceptable touches than the threshold techniques in the prior art.

At box 1009, the soft touch rejection is performed by accumulating the sample magnitudes for all force sensors. At boxes 1010 and 1011, the accumulated sum is then compared with a predetermined minimum threshold for calculation of coordinates.

By applying a multiplexer 510 to sequentially collect samples, an error is introduced to a given series of samples because all the samples are not collected simultaneously. This error is minimized by the rapid collection, as shown in FIG. 4, of a plurality of samples 401*a*. Furthermore, because the effects of quantization error and noise on the sampled signal is reduced by collecting many samples, this technique provides inherently more accurate calculations of the coordinates of the touch than would occur if only one simultaneous series of samples is collected.

The above-described sampling method is representative of what is known in the trade as a serial collection of data. A parallel collection of samples and the elimination of the multiplexer may be achieved by providing additional analog to digital converters between the coupling units 508 and the processing unit 512. While the use of a parallel collection of data may be seen to eliminate the sampling error caused by serial sampling, the use of the depicted multiplexer 510 and serial sampling is currently economically advantageous.

Referring to FIGS. 1, 5, and 10, calculating circuit 512*a* of processing unit 512 is employed for calculating the coordinates x,y of point M of the momentary, localized force F touching the touch surface 101*a* of a display. As previously described, the moment arm equation from the laws of statics is applied to the averaged reactionary force values acquired for each force sensing device at box 1017 of FIG. 11. After the reactionary force values and the coordinates of the individual force sensing devices are stored in memory 512*b* of the calculating unit 512*a*, calculating unit 512*a* calculates the x,y coordinates of point M.

Processing unit 512 may be connected to a separate display control 514*a* of a second processing unit 514 associated with the display, or it may comprise the second processing unit 514. In either case, one or the other processing units may compare the calculated x,y coordinates of the point M of the touch with the coordinates of data presented on the screen. A function stored in the memory of the appropriate processing unit may be performed corresponding to the calculated coordinates of the touch. If the function chosen by the touch is to present a new keyboard structure on the screen, the new keyboard structure, selectable from a plurality of such structures stored in memory, is displayed and activated.

Figure 6:
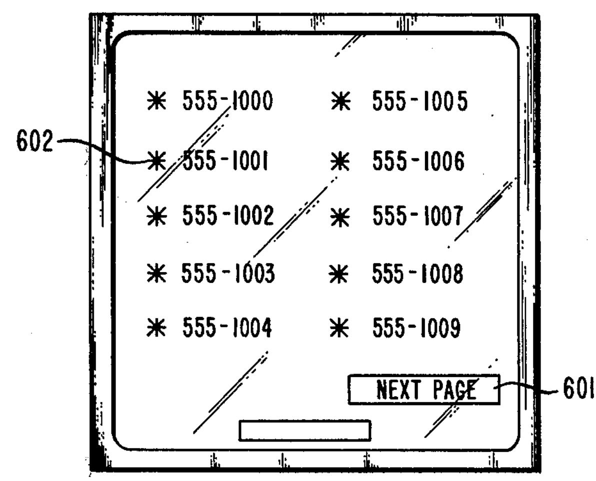
FIG. 6 is a drawing of a programmable keyboard display presenting selectable menu and item choices to a user.

Referring to FIG. 6, a keyboard structure comprising ten items is depicted. A particular item 602 and its associated function may be activated by momentarily touching a character such as an asterisk associated with item 602. Similarly, should a new keyboard structure be desired, a second character or similar activatable character such as a box 601 may be activated by touch.

In one embodiment constructed by the inventors, a 5-inch cathode ray tube display screen is mounted to a rigid support structure. A standard deviation of error of about 3 percent or about 0.15 inch is achieved in this embodiment. The error is small as compared to the diameter of a user's finger touching the glass surface of the cathode ray tube. The error also includes the inherent raster drift and image distortion of the cathode ray tube employed.

Of course, if another form of visual display is used, no raster drift or distortion error will result. The principles of the present invention may be employed if, for example, a flat, rigid rear projection screen; a plasma panel display; a liquid crystal display; or a light emitting diode display are employed, this list being exemplary and not exhaustive.

A complete typewriter keyboard, a list of names from a repertory telephone dialer, or a security system alarm or function panel are exemplary of keyboard structures presentable on the display. Additionally, it is seen that these structures, stored in memory, are directly selectable and, hence, programmable as new individual structures may be programmed into the memory of the processing unit 512 or 514.

Figure 7:
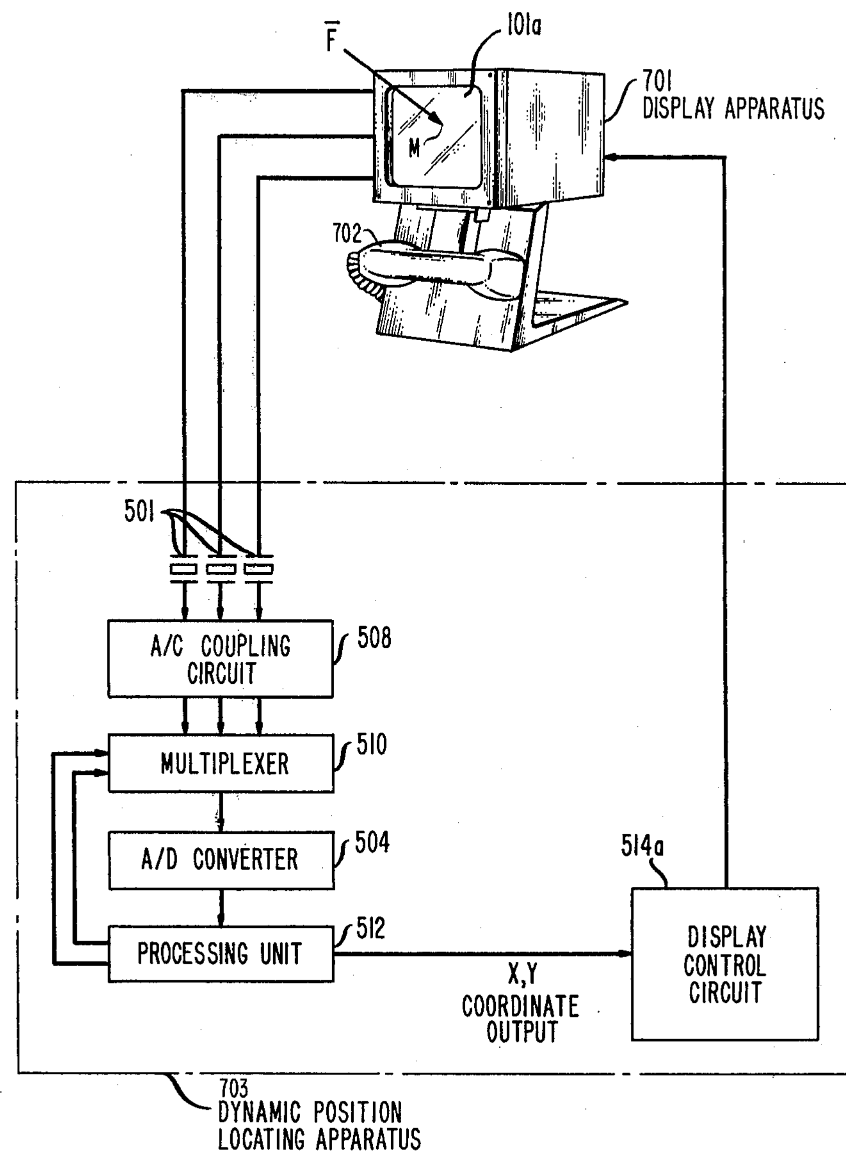
FIG. 7 is a drawing and block diagram of a telephone terminal comprising a keyboard display similar to that depicted in FIG. 6 and dynamic position locating apparatus in accordance with the present invention.

Referring to FIG. 7, a block diagram of a dynamic touch-sensitive position locating system is shown comprising a display apparatus 701 and dynamic position locating apparatus 703. The telephone handset 702 of display apparatus 701 is depicted to exemplify the use of the present invention as a telephone terminal. The display screen 101*a* of display apparatus 701, for example, may display touch-selectable repertory dialing lists, a telephone message retrieval functional character, or the buttons of a dual frequency tone telephone dial.

The operation of the telephone terminal system is now briefly summarized. Similar reference characters are employed in FIG. 7 where possible to correspond to earlier identified reference characters. A user removes handset 702 from its cradle and receives dial tone. The buttons of a dual frequency tone telephone dial are visually presented on screen 101*a* along with other alternative functional characters. A user entered touch causes a momentary localized force F to impinge at point M on surface 101*a* of display apparatus 701. The force F is detected at force sensing devices 501 which provide triangular support to touch surface 101*a* at the locations of mounting arrangements comprising the force sensing devices 501. The mounting arrangements may be similar to the one depicted in FIG. 1 or to those described in patent application Ser. No. 214,173 filed concurrently herewith.

If processing unit 512 determines that voltage samples collected for each force sensing device 501 exceed the average reference level stored in memory by a predetermined threshold value, sampling continues. Referring briefly to FIG. 10, multiplexer 510 sequentially collects a plurality of samples upon command of the processing unit 512 either until a predetermined period of time lapses (403 of FIG. 4) or until the second zero crossing of the voltage/time curve is detected (404 of FIG. 4).

The samples are digitized by analog to digital converter 504 and provided to processing unit 512. The x,y coordinates of the touch point M are computed, and the processing unit 512 recognizes that the touch has occurred at a point corresponding to a function stored in memory. The function stored in memory may be to send dual frequency tones corresponding to the digit of a telephone number or to present to the user a new keyboard structure such as a repertory dialing list in place of the telephone dial then presented. The processing unit 512 then causes the performance of that function. In the event that, for example, the selected function is to present on the screen a repertory dialing list, display control circuit 514*a* is activated. The display control circuit causes the new keyboard structure, in this case, the repertory dialing list, to be presented on the display, the list corresponding to a structure retrieved from the memory of processing unit 512.

We claim:

1. A system for determining the location of a localized force applied to a surface, the system comprising a plurality of force sensing devices adapted to be associated with the surface, each sensing device translating forces at its location into proportional electrical signals,
CHARACTERIZED BY
an alternating current coupling circuit (508) associated with each force sensing device (501), the coupling circuit responding to the force proportional electrical signal output of the associated force sensing device and having a particular gain versus frequency characteristic curve (301).

2. A system for determining the location of a localized force as recited in claim 1
FURTHER CHARACTERIZED IN THAT
the AC coupling circuit (508) comprises
a first filtering circuit (503 and 505) for attenuating signals below a particular frequency from the electrical signal output of the associated force sensing device,
an amplification circuit (507), for amplifying the electrical signal output,
and a second filtering circuit (504 and 506), for attenuating signals above a particular frequency from the electrical signal output.

3. A system for determining the location of a localized force applied to a surface, the system comprising a plurality of force sensing devices adapted to be associated with the surface, each sensing device translating forces at its location into proportional electrical signals,
CHARACTERIZED BY
coupling circuit (508) for accentuating the dynamic characteristics (301) of the localized force (F) applied to the surface (101*a*).

4. A system for determining the location of a localized force as recited in claim 3
FURTHER CHARACTERIZED IN THAT
the coupling circuit further comprises
means for matching the impedance of an associated force sensing device (105, 501, or 501*a*).

5. A position locating system as recited in claims 1, 3 or 4
FURTHER CHARACTERIZED IN THAT
the coupling circuit (508) comprises a filter circuit (503, 504, 505, and 506) and an amplification circuit (507).

6. A position locating system for determining the location of a localized force (F) applied to a surface (101*a*), a plurality of force sensing devices (105, 501, or 501*a*) for translating forces at the location of a force sensing device into proportional electrical signals and a processing system for determining the coordinates of the point of application of the localized force,
CHARACTERIZED IN THAT
the processing system (512) comprises a sample collection circuit (508, 510 and 511) for collecting samples (401*a*) of the force proportional electrical signals at a rate much higher than the highest rate at which the localized force may be repeatedly applied to the surface of the rigid body, the effects of quantization error and noise being thereby reduced.

7. A position locating system as recited in claim 6
FURTHER CHARACTERIZED IN THAT
the processing system (512) further comprises a calculating circuit (512*a*) for calculating average reference levels for each force sensing device (105, 501, or 501*a*) and
memory (512*b*) for temporary storage of the average reference levels for each force sensing device.

8. A position locating system for determining the location of a localized force (F) applied to a surface (101*a*), a plurality of force sensing devices (105, 501, or 501*a*) for translating forces at the location of a force sensing device into proportional electrical signals and a processing system for determining the coordinates of the point of application of the localized force,
CHARACTERIZED IN THAT
the processing system (512) comprises a calculating circuit (512*a*) for averaging a plurality of electrical signal samples collected during the application of the localized force (F) from each force sensing device (105, 501, or 501*a*) before calculating the coordinate values of the point of application of the localized force.

9. A position locating system for determining the location of a localized force (F) applied to a surface (101*a*), a plurality of force sensing devices (105, 501, or 501*a*) for translating forces at the location of a force sensing device into proportional electrical signals and a processing system for determining the coordinates of the point of application of the localized force,
CHARACTERIZED IN THAT the processing system (512) comprises a clocking and sample request circuit (511) for collecting samples (401a) during the application of the localized force (F) either until a particular interval of time (404) expires or until a particular zero crossing (403) of the force proportional electrical signal is detected, whichever event occurs first.

10. A position locating system for determining the location of a localized force (F) applied to a surface (101a), a plurality of force sensing devices (105, 501, or 501a) for translating forces at the location of a force sensing device into proportional electrical signals and a processing system for determining the coordinates of the point of application of the localized force,

CHARACTERIZED IN THAT the processing system (512) comprises a calculating circuit (512a) for establishing average reference voltage levels for each force sensing device (501), the average reference voltage levels reflecting a quiescent state condition.

11. A position locating system as recited in claim 10 FURTHER CHARACTERIZED IN THAT the processing system (512) establishes new average reference voltage levels for each force sensing device (501) prior to the application of the localized force (F).

12. A position locating system for determining the location of a localized force (F) applied to a surface (101a), a plurality of force sensing devices (105, 501, or 501a) for translating forces at the location of a force sensing device into proportional electrical signals and a processing system for determining the coordinates of the point of application of the localized force,

CHARACTERIZED IN THAT the processing system (512) comprises a conduit (512a) for rejecting touches which are shorter than a particular duration or of a lesser magnitude than a particular magnitude of force.

13. A position locating system for determining the position of a localized force (F) applied to a surface (101a), plurality of force sensing devices (105, 501, or 501a) for translating forces at the location of a force sensing device into proportional electrical signals and a processing system for determining the coordinates of the point of application of the localized force,

CHARACTERIZED BY circuitry (504, 512) for rejecting touches which are of a greater magnitude than a particular magnitude of force.

14. A position locating system as recited in claim 13 FURTHER CHARACTERIZED IN THAT the circuitry for rejecting touches comprises an analog to digital converter (504) having a particular bit capacity.

15. A position locating system as recited in claim 13 FURTHER CHARACTERIZED IN THAT the touch rejection circuitry (504 and 512) activates a means (514a) for warning the user that touches above the predetermined magnitude are too hard.

16. A position locating system as recited in claims 9, 12, or 13

FURTHER CHARACTERIZED IN THAT the processing system (512) further comprises memory (512a) having permanent memory for storing algorithms and temporary memory for storing electrical signal samples (401a), average reference levels for each force sensing device (501), and mathematical manipulations thereof.

17. A position locating system for determining the location of a localized force (F) applied to a surface (101a), a plurality of force sensing devices for translating forces at the location of a force sensing device into proportional electrical signals and a processing system for determining the coordinates of the point of application of the localized force,

CHARACTERIZED BY an alternating current coupling circuit (508) associated with each force sensing device for receiving the force proportional electrical signal output and for filtering therefrom electrical signals substantially above and substantially below a particular frequency, a clocking and sample request circuit (511) having a predetermined request rate much greater than the rate at which the localized force may be repeatedly applied to the surface of the rigid body, a multiplexer circuit (510), responsive to the clocking and sample request circuit (511), for collecting electrical signal samples (401) from each force sensing device until a particular interval of time (402) lapses or until a particular zero crossing (403) of the force proportional electrical signal is detected, whichever event occurs first, an analog to digital converter (504), responsive to the multiplexer circuit (510), for converting the samples to digitized form and a coordinate calculating circuit (512a), responsive to the analog to digital converter circuit (504), for averaging the digitized electrical signal samples of each force sensing device before calculating the coordinate values of the point of application of the localized force.

18. A programmable keyboard comprising a visual display (101) for displaying a keyboard structure whose content may be selected by a user, the visual display having a surface (101a) exposed to the application of a localized force which is detected by at least three force sensing devices (501) mounted to the visual display

CHARACTERIZED IN THAT the programmable keyboard comprises dynamic position locating apparatus comprising a processing unit (512) for calculating the coordinates of the location of the localized force applied to the exposed surface of the visual display, the processing unit comprising:

memory (512b) for storing a plurality of keyboard structures and a display control circuit (514a), responsive to the calculation of the coordinates, for controlling the keyboard structure presented on the visual display.

19. A programmable keyboard as recited in claim 18 FURTHER CHARACTERIZED IN THAT the dynamic position locating appparatus comprises at least three alternating current coupling circuits (508), each associated with a force sensing device and comprising amplification and filter circuitry for providing the processing unit with accentuated dynamic characteristics of the force sensed by the associated force sensing device.

20. A method of calculating the coordinates of location of a localized force applied to a surface supported by a plurality of force sensing devices, comprising the steps of: collecting a force proportional electrical signal sample from each of the force sensing devices and calculating the values of the coordinates of the localized force using moment arm equations derived from the laws of statics

CHARACTERIZED IN THAT in the sample collection step, a plurality of samples are collected for each force sensing device during the presentation of the localized force, either until a particular zero crossing of one force proportional electrical signal is detected or until a particular period of time lapses whichever event occurs first.

21. A method of calculating the coordinates of location of a localized force as recited in claim 20

FURTHER CHARACTERIZED IN THAT the plurality of samples are sequentially collected from the force sensing devices at a rate much higher than the rate at which the localized forces may be applied to the touch plate surface.

22. A method of calculating the coordinates of location of a localized force as recited in claim 20.

FURTHER CHARACTERIZED IN THAT in the sample collection step, an average sample value is calculated from the plurality of samples collected for each force sensing device and in the x,y coordinates calculation step, the calculation is performed based upon the average sample values for each force sensing device.

23. A method of calculating the coordinates of location of a localized force applied to a surface associated with a plurality of force sensing devices, comprising the steps of: collecting a force proportional electrical signal sample from each of the force sensing devices and calculating the values of the coordinates of the localized force

CHARACTERIZED IN THAT in the sample collection step, a plurality of samples (401*a*) are collected for each force sensing device during the application of the localized force and an average sample value for each force sensing device is then calculated and in the coordinate calculation step, the coordinate values are calculated employing the average sample values for each force sensing device.

24. A method of calculating the coordinates of location of a localized force applied to a surface supported by a plurality of force sensing devices, comprising the steps of:

collecting a force proportional electrical signal sample from each of the force sensing devices and calculating the values of the coordinates of the localized force using moment arm equations derived from the laws of statics

CHARACTERIZED BY the preliminary steps of: collecting a number of electrical signal samples during a quiescent period from each force sensing device and calculating an average reference level from the collected samples for each force sensing device.

25. A method of calculating the coordinates of location of a localized force as recited in claim 24

FURTHER CHARACTERIZED IN THAT during the preliminary step of collecting a number of electrical signal samples and in the event that a sample falls outside a narrow range about previously collected samples, the preliminary collection step restarts.

26. A method of calculating the coordinates of location of a localized force applied to a surface supported by a plurality of force sensing devices comprising the steps of:

collecting a force proportional electrical signal sample from each of the force sensing devices and calculating the values of the coordinates of the localized force using moment arm equations derived from the laws of statics

CHARACTERIZED IN THAT during the sample collection step, a particular average reference voltage level is subtracted from each collected sample to provide an adjusted sample value.

27. A method of calculating the coordinates of location of a localized force as recited in claim 26

FURTHER CHARACTERIZED IN THAT during the sample collection step, the adjusted sample values are summed and that sum compared to a particular minimum threshold value, reflecting the application of a localized force.

28. A system for determining the location of a localized force applied to a surface, the system comprising a plurality of force sensing devices for detecting and generating analog electrical signals proportional to the applied force.

CHARACTERIZED BY a coupling circuit (508) comprising a passband filtering circuit associated with each force sensing device, the coupling circuit for reshaping the electrical signals therefrom to a form accentuating features characteristic of different types of applied forces.

* * * * *

UNITED STATES PATENT AND TRADEMARK OFFICE
CERTIFICATE OF CORRECTION

PATENT NO. : 4,340,777

DATED : July 20, 1982

INVENTOR(S) : John DeCosta, James B. Mallos and David B. Roe

It is certified that error appears in the above—identified patent and that said Letters Patent is hereby corrected as shown below:

Column 8, line 54, delete "Accordingly, it is appropriate".

Column 13, line 35, "conduit" should read --circuit--.

Signed and Sealed this

*Twenty-eighth* Day of *December 1982*

[SEAL]

*Attest:*

GERALD J. MOSSINGHOFF

*Attesting Officer* *Commissioner of Patents and Trademarks*